Oct. 9, 1934.  D. R. BAILEY  1,975,761
CRACKING APPARATUS
Filed Nov. 15, 1932  2 Sheets-Sheet 1
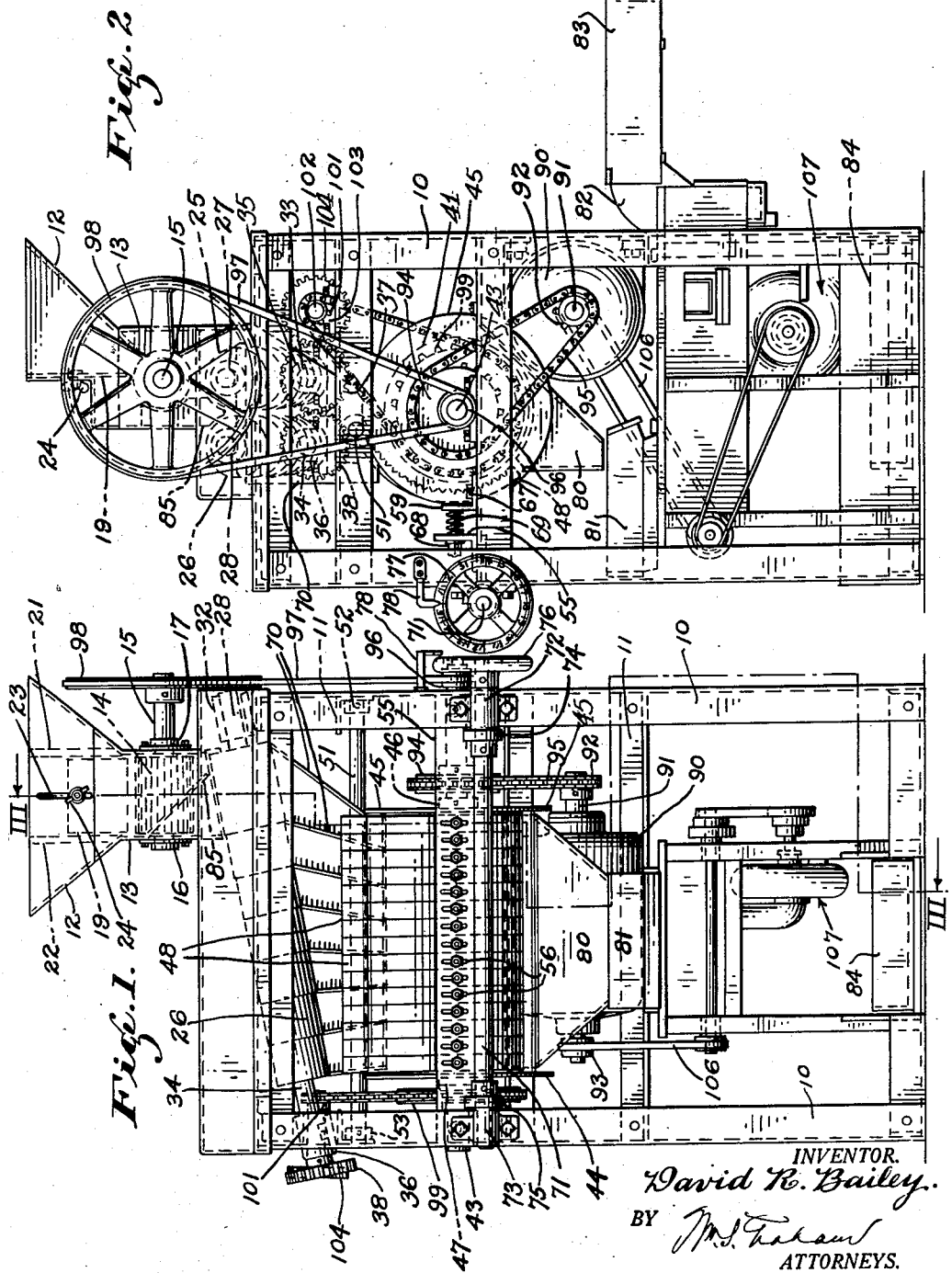
INVENTOR.
David R. Bailey.
BY
ATTORNEYS.

Oct. 9, 1934.  D. R. BAILEY  1,975,761
CRACKING APPARATUS
Filed Nov. 15, 1932   2 Sheets-Sheet 2
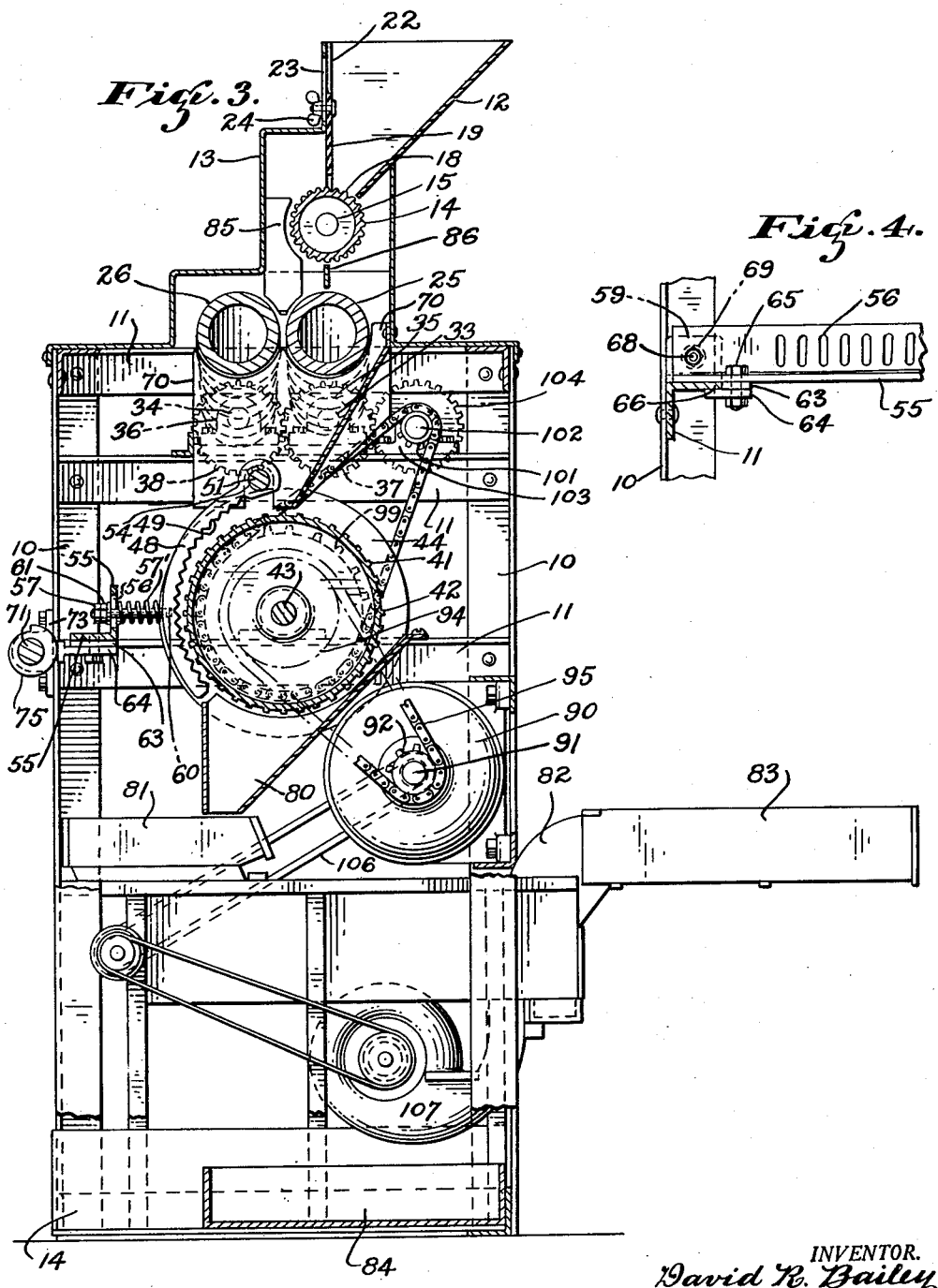

Patented Oct. 9, 1934

1,975,761

UNITED STATES PATENT OFFICE 1,975,761

CRACKING APPARATUS

David R. Bailey, Sacramento, Calif., assignor to California Almond Growers Exchange, San Francisco, Calif., a corporation of California Application November 15, 1932, Serial No. 642,733

4 Claims. (Cl. 146—11)

This invention relates to a cracking apparatus, and more particularly to an apparatus for shelling or hulling a quantity of a product which includes individual miscellaneous sized units, such as almonds, pecans, peanuts and the like.

It is one object of this invention to provide an improved apparatus for shelling or hulling a product which includes individual miscellaneous sized units.

Another object is to provide in an apparatus, novel means for shelling or hulling a product which includes units of various sizes, that shall separate such products according to size and separately crack the several sizes.

Another object is to provide an apparatus for shelling or hulling batches of individual miscellaneous sized units, wherein means are provided for grading such product as to size, that shall separate said product in accordance with predetermined dimensions, and that shall separately crack and hull the different sizes included in each of the several grades.

Another object is to provide in an apparatus for shelling or hulling a product composed of different sized units having the above characteristics, novel means for separately cracking and hulling the several different sizes of the product.

A further object is to provide in an apparatus for shelling or hulling a product which includes units of various sizes, novel means for grading such units as to size and separately hulling or shelling the several grades of the product.

A further object is to provide in an apparatus having the above characteristics, novel means for adjusting each of the several hulling or shelling units, and novel means for simultaneously adjusting all of the shelling or hulling units.

A still further object is to provide an apparatus having the above characteristics that shall be simple in structure, efficient and reliable in operation, durable, portable and comparatively cheap to manufacture.

The above and other objects will be made apparent throughout the further description of the invention, when taken in connection with the accompanying drawings, wherein like reference characters refer to like parts. It is to be distinctly understood that the drawings are not a definition of the invention, but are merely one form of an apparatus for carrying out the invention, the scope of the invention being defined by the appended claims.

In the drawings:—

Fig. 1 is an end elevational view of an apparatus embodying the invention.

Fig. 2 is a side elevational view, taken from the right side of Fig. 1.

Fig. 3 is a sectional view taken on the line III—III of Fig. 1, and

Fig. 4 is an enlarged detail view, illustrating an embodiment of the invention.

The present invention may be employed for hulling or shelling various products, which includes individual miscellaneous sized units, such as almonds, pecans, peanuts and the like.

The present apparatus comprises means for feeding the product to be treated to the device, means for grading the product according to size, means intermediate the feeding means and grading means for guiding the product to the grading means, means for cracking the product, means intermediate the grading means and cracking means for conveying the product from the grading means to the cracking means, means for adjusting the cracking means, means for separating the meat of the product from the hull or shell, and means for driving the several elements.

In the form shown, there is provided a suitable supporting structure preferably composed of angle iron members comprising vertical supports 10 and horizontal supports 11 connecting the vertical supports in such a manner as to provide a portable framework substantially rigid for properly supporting the apparatus.

For the sake of simplicity, the apparatus will be described in sequence with the operation of the device.

At the top of the machine is provided a supply hopper 12 for receiving the product to be treated. The hopper 12 terminates at its lower end in a reduced portion, for the well known purpose. A feed box 13 is positioned below the hopper and having an opening therein adapted to receive the lowermost end of the hopper 12. Within the feed box 13 is provided a feed roll 14. The feed roll 14 is carried by a shaft 15, the latter being rotatably supported in the housing of the feed box, as shown at 16 and 17.

The lower end of the hopper 12 which is open, is formed so as to cooperate with the feed roll, the latter being corrugated as shown at 18, and to cooperate with an adjustable gate 19 slidably mounted between guideways 21 and 22 disposed on the side walls of the hopper 12.

Means are provided for adjustably sliding the gate 19 vertically between guideways 21 and 22, which means may comprise a slot 23 provided in the side wall of the hopper intermediate the guideways 21 and 22, and adapted to receive and cooperate with a locking means 24 carried by the gate 19.

Positioned below the feed box are a pair of inclined elongated rolls, represented in their entirety by 25 and 26. Each of the rolls 25 and 26 are machined to form a plurality of rolls of different diameters; these latter rolls decreasing in diameter from their uppermost roll to the lowermost roll, whereby to form spaces of different lengths between adjacent faces of the several cooperating roll portions. The rolls 25 and 26 are supported by the framework and are turnably mounted in suitable bearings. The elongated rolls 25 and 26 each are provided at their upper ends with a reduced portion, forming shafts 27 and 28 respectively. These shafts are turnably mounted in suitable bearings, as shown at 31 and 32. The lower ends of the rolls 25 and 26 terminate in reduced portions, forming shafts 33 and 34. The shafts 33 and 34 are somewhat longer than the shafts 27 and 28, and are turnably mounted in suitable bearings, carried by the framework, as shown at 35 and 36. The ends of the shafts 33 and 34 extend outwardly from the framework and are provided at their ends with gears 37 and 38, for rotating the rolls 25 and 26 in opposite directions, the purpose of which will hereinafter be described.

The cracking or hulling mechanism includes a cracking drum 41 having axially arranged longitudinal grooves 42 therein. The drum 41 is rigidly mounted on a shaft 43, by means of end plates 44 and 45. The end plates 44 and 45 are welded to the ends of the drum, and are each provided with hub portions 46 and 47 adapted to receive the shaft 43 upon which the drum is supported.

Means are provided for rotating the shaft 43, which in turn rotates the drum 41, which means will hereinafter be described.

The cracking or hulling means also includes, for cooperating with the drum, concavo convex shaped fingers 48; the concave portion of the fingers being provided with teeth, as shown at 49. The fingers 48 are supported at their upper ends by means of a shaft or rod 51, the latter having its ends fixed to the framework, as shown at 52 and 53. The upper ends of the fingers 48 are provided with openings 54 for receiving the shaft 51 and permitting the fingers to pivotally turn about the shaft 51.

The fingers 48 are held in position longitudinally of the shaft by means of the end plates 44 and 45 of the drum 41. The plates 44 are greater in diameter than the drum and extend outwardly from the drum, forming flanges between which the fingers are mounted.

Means are provided for adjusting the fingers 48 with respect to the drum 41, which means consist of a spring tensioned slidable angle iron bar 55 having a plurality of openings 56 therein. The openings 56 are spaced apart and positioned to register with corresponding fingers.

A connecting means 57 is provided for each of the fingers 48, the connecting means extending through the corresponding opening 56 in the spring held bar 55, and having a spring 57' interposed between the bar 55 and its corresponding finger 48. The connecting means 57 has one of its ends threaded into the finger 48, as shown at 60; the other end of the connecting means extending through its corresponding opening 56 in the slidable angle iron bar member 55, and is provided on its outer end with a threaded nut 61, for adjusting the finger 48 relative to the drum 41. The angle iron 55 is slidably mounted at each of its ends on an associated flange of the angle iron 11 of the framework, so that it may be moved selectively toward or away from the drum 41 as best shown in Fig. 4. A spacer member 63 is positioned between another member 64 and the members 64 and 63 are held rigidly in place adjacent the end of the bar 55 by means of a bolt and nut 65. This construction provides a groove 66 for receiving one side of the angle iron 11 and providing a slidable support for the member 55. The member 55 is spring held at each of its ends, as shown in Fig. 2.

Spaced from the ends of the member 55 is a member 59 which may be right angular in shape, having one of its sides bolted to the cooperating angle iron 11, as shown at 67, and having its other side connected to the end of the member 55 by means of a bolt 68. A relatively strong spring 69 is interposed between the member 55 and member 59 and surrounding the bolt 68. This permits the member 55 to slide inwardly against the springs 69 but preventing outward movement of the member 55. The several fingers 48 are selectively adjusted relative to the drum 41 by the connecting means 57. These fingers may be set as desired for cracking the product of different sizes as the product is conveyed by cooperating chutes or guides 70 connecting the roll portions with their cooperating cracking fingers. Since the size of the product passing through the larger roll portions, or the uppermost roll portions, will be smaller than the product passing through the remaining roll portions, it follows that the fingers 48 associated with the chute 70 connecting the roll portions of larger diameter will be adjusted by the means 57 to provide the proper space between the cooperating fingers 48 and cracking drum 41.

Means are provided for simultaneously adjusting all of the fingers, which means comprises a shaft 71 turnably mounted on the frame, as shown at 72 and 73. The shaft 71 is provided adjacent its ends with cam members 74 and 75. These cam members are adapted to contact with the member 55 through its associated member 64 for sliding the member 55 inwardly against the springs 69.

An actuating wheel 76 is provided on one end of the shaft 71 for rotating the cams 74 and 75. The rim of the wheel 76 may be graduated, as shown at 77, the graduation being adapted to cooperate with the indicator 78 carried by the adjacent frame member. Therefore, when a quantity of a product having varying sized units is to be treated, it is only necessary to operate the actuating wheel 76 for simultaneously adjusting the several cracking fingers as desired. A chute or hopper 80 is provided beneath the drum 41 for conveying the product to a cleaner for separating the meat from the hulls or shells of the product.

The cleaner may be of any suitable type and provided with a hopper 81 cooperating with the hopper 80 for conveying the product into the cleaner where it is subjected to forced draft sufficient to carry the hulls or shells of the product by way of a passageway 82 into a container 83; the meat of the product being heavier than the hulls or shells will fall into a receptacle 84.

Means are provided for rotating the feed roll, grading rolls, cracking drum and cleaner, which means may comprise an electric motor 90, having a power shaft 91. Each end of the power shaft is provided with a pulley or sprocket wheel 92 and 93. The cracking drum is rotated by means of a pulley or sprocket wheel 94 mounted on the shaft 43, and connected to the pulley 92 by means of a belt or sprocket chain 95. The outer end of the shaft 43 is provided with a second pulley or sprocket wheel 96, for driving the feed roll 14, by way of a belt 97, connecting the pulley 96 with a pulley or sprocket wheel 98, carried by one end of the feed roll shaft 15. The shaft 43 of the cracker drum 41 is provided with a third pulley 99 disposed at its inner end. The pulley 99 is connected to a pulley 101 carried by a stub shaft 102 mounted on the frame, as shown at 103. The other end of the shaft 103 is provided with a spiral gear 104 for meshing with the gear 37 mounted on the end of the shaft 33 of the grading roll 25, the latter gear meshing with the gear 38 on the shaft 34 of the grading roll 26.

It can be seen therefore that the spiral gear 104, meshing with the gear 37, will cause the gears 37 and 38 to rotate in opposite directions for rotating the rolls 25 and 26 likewise. The pulley or sprocket wheel 93 is connected to the cleaner by way of a belt 106 for driving the blower mechanism of the cleaner, represented in its entirety by 107.

The operation of the device is as follows:—

The product to be treated is placed in the hopper 12, where it is fed by the feed roll 18, by way of the gate 19, onto and between the rolls 25 and 26. Suitable guides 85 and 86 are provided in the feed chamber for directing the product onto the rolls. The product passes down between the rolls, which are rotating in opposite directions, and is graded according to their size, by falling through the cooperating portions, through the corresponding chutes 70, onto the cracker drum 41, and between the corresponding cracking fingers 48; the cracking roll 41 rotating towards the cracking fingers 48 advancing the product against the teeth 49, where the product is cracked and delivered into the hopper 80, the latter conveying the product to the hopper 81 of the cleaner.

While I have illustrated and described but one embodiment of the invention, it will be apparent to those skilled in the art that certain changes, modifications, substitutions, additions and omissions may be made in the structure without departing from the spirit and scope of the invention, as defined by the appended claims.

I claim:—

1. A cracking apparatus including a cracking drum, means for rotating said drum, a plurality of cracking fingers turnably mounted in spaced relation to said drum, a separate means for adjusting each of said fingers relative to said drum, means for simultaneously adjusting all of said fingers relative to said drum, the last said means including a spring held member adapted for lateral movement with respect to said drum, and a cam member for moving said spring held member.

2. An apparatus for cracking a quantity of a product which includes individual miscellaneous sized units comprising means having varying sized orifices through which the units may pass for grading said product according to size, means for cracking each of the several grades of the product, the last said means including a rotatable drum, a plurality of arcuate shaped cracking fingers disposed in spaced relation to said drum, the said fingers being turnably mounted at one of their ends on a fixed axis and a resilient means associated with each of said fingers for urging said fingers toward said drum, means for positively limiting the movement of said fingers toward said drum, means for adjusting the resiliency of the resilient means associated with each of said fingers, another means for simultaneously adjusting the resiliency of all of said resilient means associated with said fingers, and guide means from the respective varying sized orifices of the grading means to the space between the drum and respective fingers corresponding to the respective orifices.

3. An apparatus for cracking a quantity of a product which includes individual miscellaneous sized articles, comprising means having orifices of varying sizes through which the articles may pass for grading said articles according to size, means for cracking each of the several sizes of said articles, said latter means including an axially grooved drum and a plurality of arcuately shaped cracking fingers pivotally mounted in spaced relation to the face of the drum, said fingers being held in resilient relation with respect to said drum, means for adjusting the resiliency of said fingers independently of each other, means for adjusting simultaneously the resiliency of all of the said fingers, and guide means for directing articles from the respective orifices of the grading means to correspondingly adjusted fingers of the cracking means.

4. A nut grading and cracking device comprising a feed chute having a feed roller and means for regulating the feed past said roller, mechanism for grading the nuts according to size comprising a pair of relatively spaced downwardly inclined rotatably mounted rollers having the space between their rotating faces progressively increasing so as to provide orifices of varying sizes through which nuts may pass, means underlying said rollers for cracking nuts which pass through the space between the rollers, said latter means including an axially grooved drum and a plurality of arcuately shaped cracking fingers pivotally mounted in spaced relation to the face of the drum, said fingers being held in resilient relation with respect to said drum, means for adjusting the resiliency of said fingers independently of each other, means for adjusting simultaneously the resiliency of all of the said cracking fingers, and guide means for directing articles from the respective orifices of the grading means to correspondingly adjusted fingers of the cracking means.

DAVID R. BAILEY.